Jan. 1, 1963   R. L. CRAMER   3,071,128
PRESSURE CONTROL VALVE
Filed Dec. 29, 1958
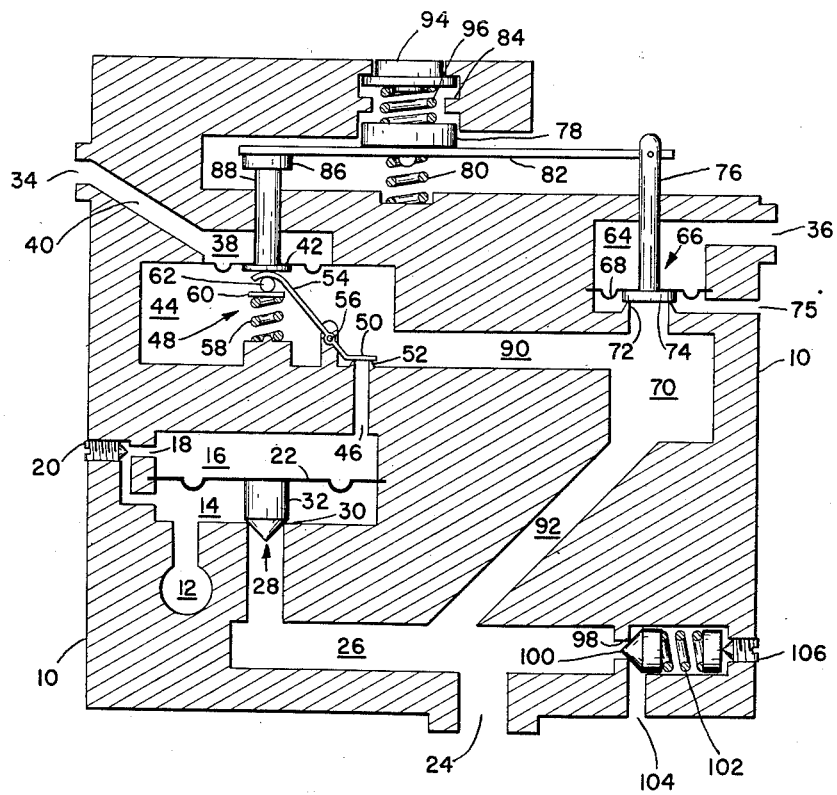
INVENTOR.
ROBERT L. CRAMER
BY
ATTORNEY United States Patent Office 3,071,128
Patented Jan. 1, 1963

3,071,128
PRESSURE CONTROL VALVE
Robert L. Cramer, Davenport, Iowa, assignor to The Bendix Corporation, a corporation of Delaware
Filed Dec. 29, 1958, Ser. No. 783,491
2 Claims. (Cl. 128—1)

This invention relates to pressure control valves and more particularly to an anti-G valve for regulating the flow of a fluid to an anti-G garment relative to gravitational forces.

With the advent of modern aircraft it has become more important to protect the aviator when he is subjected to accelerational and centrifugal forces during various dives and maneuvers. When the aviator is subjected to these forces blood will drain from his brain to the extent that his optic nerves are affected which will result in a temporary blindness, this blindness is commonly referred to as "blacking-out." In this connection anti-G garments and anti-G valves have been developed to work in combination to prevent the "blacking-out" of the pilot when he is subjected to these gravitational forces.

The anti-G valves which are now being used are of two main types. One type is an anti-G valve of the continuous flow design. This type is a direct mechanically operated valve having a spring and weight construction in which fluid is continuously fed through the valve and upon a gravitational force being applied, the flow of fluid through the valve is restricted resulting in a build-up of fluid pressure in the valve and the associated G-garment. A second type of anti-G valve is one of the demand valve design. This type is a direct mechanically operated valve having a spring and weight construction in which the flow of fluid into the valve and associated anti-G garment is regulated according to the gravitational forces applied to the valve. Both of these valves employ a direct mechanical loading method of opening and closing the valve when the valve is subjected to a gravitational force; the structure necessary to make an operative valve of this construction is bulky and heavy.

An object of the invention is to provide a fluid loaded anti-G valve for use with an anti-G garment.

Another object of the invention is to provide an anti-G valve which is small, lightweight and relatively inexpensive.

A further object of the invention is to provide an anti-G valve in which the force required to operate the valve comes from a small weighted member plus the fluid pressure from a second source.

A still further object of the invention is to provide an anti-G valve which can use the regulated fluid pressure of the pressure suit of the aviator as a second source of force for valve control.

A still further object of the invention is to provide an anti-G valve which may be manually operated if the mechanical structure fails and which valve may be tested immediately prior to use by a manual operation.

A still further object of the present invention is to provide an anti-G valve in which the wearer of the associated anti-G garment is protected against harmful injury because of garment overpressure.

The pilot of modern high performance aircraft is also protected against the decreased atmospheric pressure of the higher altitudes by means of pressure suits. A pressure regulator is used to control the pressure in the pressure suits in accordance with the altitude at which the aircraft is operating. These suits are of two types, either a full pressure suit or a partial pressure suit. The full pressure suit is a garment which covers the entire body of the aviator whereas the partial pressure suit is of the vest type covering only the upper portion of the aviator's body. Usually the partial pressure suit does not encompass the anti-G garment worn by the aviator whereas the full pressure suit will encompass the aviator's anti-G garment.

The invention has as one of its objects the provsion of an anti-G valve for use with an anti-G garment, which valve and garment can be used with either a full pressure suit or a partial pressure suit.

The correct pressure must be applied to the aviator's body at all times in order to give him the proper protection. The pressure applied to the aviator's body must be sufficient to protect him against the decreased atmospheric pressure at various altitudes and the gravitational forces attributed to the maneuvers of the aircraft. Therefore, the pressure on the aviator's body at the area where the anti-G garment is worn must be the sum of the pressure required because of gravitational forces and of the atmospheric conditions.

The invention has as one of its objects the provision of an anti-G valve which will apply the necessary pressure to the anti-G garment regardless of the type of pressure suit which the aviator is wearing.

Certain of these objects are realized in the invention by the provision of flow blocking means for preventing the flow of fluid from the pressure source to the outlet, means for controlling the opening and closing of said flow blocking means, and drive means therefore responsive to gravitational forces.

In addition, certain of these objects are realized in the invention by the provision of a fluid loaded valve whereby the direct mechanical driving means required to operate the valve are replaced in whole or in part by a fluid pressure obtainable from a second regulated fluid source.

The foregoing and other objects and advantages of the invention will appear more fully hereinafter from a consideration of the detailed description which follows; taken together with the accompanying drawing wherein an embodiment of the invention is illustrated. It is to be expressly understood, however, that the drawing is for the purpose of illustration and description and is not to be construed as defining the limits of the invention.

The single FIGURE of the drawing is an enlarged, schematic diagram of one embodiment of the invention.

Referring now to the drawing, there is shown schematically an anti-G valve designed for use with an anti-G garment which is worn by an aviator. The anti-G valve has a housing 10 having supply pressure inlet port 12 which is arranged to be connected to a suitable pressurized source of fluid supply of the aircraft. Inlet port 12 is in direct communication with lower diaphragm chamber 14. Fluid in lower diaphragm chamber 14 may flow into upper diaphragm chamber 16 by means of restricted passage 18. Flow restricting means are provided in passage 18 in the form of a screw 20. Lower diaphragm chamber 14 and upper diaphragm chamber 16 are separated by a resilient diaphragm 22 which is secured at its periphery to housing 10.

Outlet port 24 in housing 10 is arranged to be connected to the anti-G garment which is worn by the aviator. Fluid is prevented from flowing from lower diaphragm chamber 14 through passageway 26 to outlet port 24 by means of main valve 28 which comprises valve seat 30 and a valve head 32 joined to the resilient diaphragm 22.

Housing 10 has additional inlet ports 34 and 36 for fluid loading the valves hereinafter described. The anti-G valve and associated anti-G garment, when used by the aviator with a partial pressure suit, will have inlet ports 34 and 36 connected to a second or control fluid pressure supply, which supply will furnish equal pressure to the anti-G valve and pressure suit. The resultant pressure at outlet port 24 will be the sum of the pressure required due to gravitational forces and the decreased atmospheric pressure due to altitude. The anti-G valve and associated anti-G garment when used by the aviator with a full pressure suit, will have inlet ports 34 and 36 open to the ambient pressure; the resultant pressure at outlet port 24 will represent the pressure required due to gravitational forces.

Inlet port 34 leads directly into pressure chamber 38 by means of passageway 40. Diaphragm 42 is interposed between pilot valve chamber 44 and pressure chamber 38. Pilot valve chamber 44 and upper diaphragm chamber 16 are connected by means of passageway 46. Pilot valve 48 is disposed to open and close passageway 46 relative to a difference of pressure across diaphragm 42. Normally, pilot valve 48 is closed having valve head 50 seating on valve seat 52. By means of lever 54, pin 56, spring 58, plate 60 and roller 62, the pilot valve 48 is opened and closed.

Inlet port 36 leads into pressure chamber 64. The combination of vent valve 66 and sealing means 68 prevents the flow of fluid from chamber 64 into chamber 70. Closing vent valve 66 comprises valve seat 72, valve head 74 and valve stem 76. Stem 76 is slidable in housing 10.

Upon unseating of vent valve 66, fluid will flow from chamber 70 around valve seat 72 and through exhaust port 75.

Pilot valve 48 is operated by means of a drive mechanism which is actuated by weight 78. Weight 78 is normally biased in the position shown in the drawing by means of spring 80 acting on lever 82. Weight 78 is opatively connected to pilot valve 48 by means of lever 82, plate 86 and valve stem 88.

Passageway 90, chamber 70 and passageway 92 are provided so that fluid may pass from chamber 44 to outlet port 24.

A press-to-test and manual operation mechanism is provided in form of button 94 and spring 96. When not being used, spring 96 biases button 94 against housing 10. Advantageously, means are provided for limiting the movement of button 94 in the form of stop 84, thereby preventing an overpressure of the anti-G valve and anti-G garment upon manual operation.

Means are provided to prevent the build-up of excessive pressure in the outlet section of the valve and in the anti-G garment. Valve head 100 is biased against valve seat 98 by spring 102. When fluid pressure in passageway 26 exceed a preset amount valve head 100 will unseat and the excess fluid will pass into the surrounding media through outlet port 104. The bias of spring 102 is made adjustable by means of adjusting screw 106 thereby preseting the valve for the fluid pressure at which valve head 100 will unseat.

In the operation of the anti-G valve, outlet port 24 is connected to an anti-G garment which is to be worn by the aviator and inlet port 12 is connected to a suitable sure inlet ports 34 and 36 are connected to a second fluid pressure supply or are open to the ambient pressure, the operation of the anti-G valve is the same in both cases.

The anti-G valve as shown in the drawing shows the valve prior to the application of a gravitational force. In flight maneuvers, small gravitational forces do not adversely affect the pilot of the aircraft. It has been found that gravitational forces up to 1½ G can be safely withstood by a pilot. For this reason spring 80 is advantageously designed, as shown, so that a gravitational force in excess of 1½ G will have to be applied before weight 78 overcomes spring 80.

Supply pressure entering the anti-G valve at inlet port 12 goes to both sides of main diaphragm 22, passing into the lower diaphragm chamber 14 directly and to the upper diaphragm chamber 16 through the adjustable restricted orifice 18.

In flight, when the aviator is subjected to a gravitational force sufficient for weight 78 to overcome spring 80, weight 78, through lever 82 and valve stem 68, applies an additional load on closing vent valve 66. Through lever 82, plate 86 and valve stem 88, pilot valve 48 is activated and valve head 50 moves away from valve seat 52. Fluid in upper diaphragm chamber 16 flows through passageway 46, into chamber 44 and to outlet 24 through passageway 90, chamber 70 and passage way 92.

Fluid flows from upper diaphragm chamber 16 through passageway 52 at a higher rate than it can flow from lower diaphragm chamber 14 through restricted orifice 18 to refill upper diaphragm chamber 16. A differential pressure is created across main diaphragm 22 resulting in an upward movement of the diaphragm 22 and the movement of valve head 32 away from valve seat 30. Fluid will now flow from lower diaphragm chamber 14 through passageway 26 to outlet 24.

Pressure will continue to build up at outlet 24 until the required pressure at outlet 24 and the associated anti-G garment is reached as required by the movement of weight 78. The pressure at outlet 24 and in chamber 44 will be equal. The pressure in chamber 44 exerting a force on one side of diaphragm 42 will equal the force exerted on the opposite side of diaphragm 42 by the pressure in chamber 38 plus the force applied by weight 78 through its associated linkage, resulting in the closing of pilot valve 48. The pressure on both sides of main diaphragm 22 will become equal and main valve 28 will close.

The anti-G valve will remain at the same condition until a change in the gravitational force occurs and results in movement of weight 78.

Upon a decrease of the gravitational force, weight 78 will move upward and the force exerted on closing vent valve 66 will decrease. The pressure in chamber 70 against valve head 74 will be greater than the fluid pressure in chamber 64 and the force exerted by weight 78. Valve head 74 will move off valve seat 72 and the fluid will vent through exhaust port 75.

While the anti-G valve as shown in the drawing is of the construction shown and described, it is understood that the instant invention is not limited to any particular form or division. Moreover, other changes and modifications of the novel anti-G valve contemplated herein may be made by those skilled in the art without departing from the scope of the instant invention.

I claim:

1. An anti-G valve for use with an aviator's anti-G garment comprising a housing having an inlet for connection to a source of fluid under pressure and an outlet for connection to said anti-G garment, a flow path defined by said housing connecting said inlet and said outlet, a first chamber disposed in said flow path, a restricted passage, a second chamber in fluid communication with said first chamber by means of said restricted passage, a resilient diaphragm forming a common wall for said first and said second chambers, a flow control valve in said flow path connected to said resilient diaphragm and responsive to a fluid pressure differential applied across said diaphragm, means for relieving said inlet fluid pressure in said second chamber comprising a fluid passage in communication with said second chamber and said outlet, a weight movable in response to a gravitational force, pilot valve means for opening said fluid passage responsive to the movement of said weight, the pressure applied to said anti-G garment and a control pressure, means for relieving the pressure at said outlet upon a decrease of gravitational force toward normal comprising a vent valve responsive to at least one of the movement of said weight and the pressure applied to said anti-G garment.

2. An anti-G valve comprising: a housing having a pressurized supply gas inlet and a suit pressurizing gas outlet and defining a gas flowpath interconnecting said inlet and said outlet; a flow control valve in said flowpath; means for actuating said control valve comprising, a movable diaphragm connected to said control valve, means for applying source gas pressure to said diaphragm in a direction tending to open said control valve, means for applying source gas pressure at a selected rate to said diaphragm in a direction tending to close said control valve, and a pilot valve for relieving the pressure of source gas tending to close said flow control valve; means for actuating said pilot valve comprising means for applying to said pilot valve a force variable as the difference between the pressure in said passage way intermediate said control valve and outlet and a force variable as the combined force of a mass movable in response to acceleration and a gas pressure variable independently of movement of said mass; means for relieving the pressure at said outlet upon a decrease of gravitational force toward normal comprising a vent valve responsive to at least one of the movement of said mass movable in response to acceleration and the pressure applied to said suit pressurizing gas outlet.

References Cited in the file of this patent

UNITED STATES PATENTS

| | | |
|---|---|---|
| 2,622,609 | Moller | Dec. 23, 1952 |
| 2,748,786 | Isreeli | June 5, 1956 |

UNITED STATES PATENT OFFICE
CERTIFICATE OF CORRECTION

Patent No. 3,071,128                 January 1, 1963

Robert L. Cramer

It is hereby certified that error appears in the above numbered patent requiring correction and that the said Letters Patent should read as corrected below.

Column 3, line 54, after "suitable" insert -- pressure supply in the aircraft. The additional pres- --.

Signed and sealed this 30th day of July 1963.

(SEAL)
Attest:

ERNEST W. SWIDER
Attesting Officer

DAVID L. LADD
Commissioner of Patents